No. 759,537. PATENTED MAY 10, 1904.
K. MARTIN.
PHOTOGRAPHIC OBJECTIVE.
APPLICATION FILED OCT. 3, 1901.
NO MODEL.

Witnesses:

Inventor
Karl Martin
by _____
Attorney

No. 759,537.

Patented May 10, 1904.

UNITED STATES PATENT OFFICE.

KARL MARTIN, OF RATHENOW, GERMANY, ASSIGNOR TO RATHENOWER OPTISCHE INDUSTRIE, ANSTALT, VORMALS EMIL BUSCH, A.-G., OF RATHENOW, GERMANY, A FIRM.

PHOTOGRAPHIC OBJECTIVE.

SPECIFICATION forming part of Letters Patent No. 759,537, dated May 10, 1904.

Application filed October 3, 1901. Serial No. 77,445. (No model.)

*To all whom it may concern:*

Be it known that I, KARL MARTIN, a subject of the King of Prussia, German Emperor, and a resident of Rathenow, in the Kingdom of Prussia, German Empire, have invented certain new and useful Improvements in Photographic Objectives, of which the following is an exact specification.

My invention relates to improvements in photographic objectives, and has especially for its purpose to provide an objective with two lenses, which objective is spherically, chromatically, and astigmatically corrected.

It has been tried in the last years with good success to use the Gauss (telescope) objective for photographic purposes by correcting the astigmatic faults of the same.

It could be supposed that in case of means being found for attaining an astigmatic correction for photographic objectives with two lenses, so-called "Gauss objectives," these objectives would possess all the advantages connected with this Gauss type. Indeed, it has been proved by the construction of the so-called "Zeiss-Planar objective" that the anastigmatic Gauss objective is one of the best hitherto constructed. The only disadvantage of the new construction consisted in the same not being perfectly chromatically correctable. This disadvantage has been tried to do away with by constructing the two lenses forming the anastigmatic objective in the well-known manner from two glasses with nearly the same refraction, but different dispension. In this manner the chromatical correction was attained in an indirect way. It has been tried also to attain a chromatical correction of said type by means of single lenses, which could, however, be attained only when desisting from the advantage of a great opening. Till now it was believed that the chromatical correction could only be attained by using a very heavy flint-glass, which on account of want of firmness is unfit for photographic purposes, or by using a crown-glass (for the positive lens) with a higher refraction than that of the flint-glass of the negative lens. Both these suppositions have proved to be incorrect. Now it has been found by starting, for instance, in the calculation from a flint-glass with the index 1.60 and a crown-glass with the index 1.50 that after the objective being spherically and astigmatically corrected, also the chromatical correction can be attained by means of regular glasses.

Figure 1:
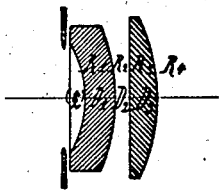
Figure 2:
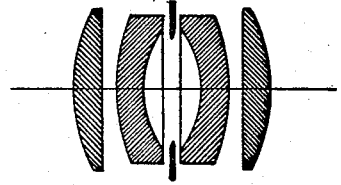

In the accompanying drawings, in Figure 1 an example of an objective constructed according to my new invention is shown. Fig. 2 shows the use of the same in a double-lens system.

The opening of the system, which is exactly spherically corrected, amounts to one-eleventh. In spite of this great opening the spherical zone fault amounts only to 0.25 millimeter in case of a focal distance of one hundred millimeters, so that by small changes of the constant the system can be corrected still for a greater opening. The chromatic fault has even been a little bit (0.5 pro mille of the focal distance) overcorrected. The astigmatism is herewith corrected for an optic angle of sixty-eight degrees. The equivalent focal distance amounts to two hundred and ten.

$R_1 = -22.36$ $$D_1 = 6.15 \quad 0.318 \quad \overline{\begin{matrix} n_D \\ 1.6031 \end{matrix}} \quad \overline{\begin{matrix} n_{a'} \\ 1.62386 \end{matrix}}$$

$R_2 = -42.56$ $$D_2 = 3.31$$

$R_3 = -383.35$ $$D_3 = 5.73 \quad 0.802 \quad 1.4967 \quad 1.50627$$

$R_4 = -33.64$ $$\frac{\triangle}{2} = 3.79$$

It is very easy to find out similar sets of glasses in which a correction is possible.

In the two lens objectives described, for instance, in the United States Letters Patent to Clark, No. 399,499, an astigmatic planing of the field—that is to say, an astigmatic correction—could never be obtained on account of the curves of the surfaces of the lenses not standing in the right proportions. The removing of the anastigmatism and the field curve is obtained according to my invention by giving to the negative meniscus lens of the system a sufficiently hollow form for compensating the anastigmatic faults for the positive meniscus lens. This new construction forms the object of the present invention and renders my new objective different from the older Gauss systems, which were not astigmatically corrected, as in the same the concave lens had no sufficient capacity of planing the field. The best form of lenses is obtained—*i. e.*, the astigmatism and the field curve are best removed—when constructing the lenses so that the sum of the differences in the curves of both lenses is perfectly or about equal to zero. This will be more clear when considering the following calculation:

The curve of the surface of the lens is called R. The reciprocal value of the latter for the focal distance equals one. Consequently curve equals $\frac{\text{focal distance}}{\text{radius}}$ or $\rho = \frac{F}{R}$. For the example given above the calculation then gives the following result:

$$\left.\begin{array}{l}\rho = -6.02 \\ \rho_1 = -3.16\end{array}\right\} = \rho - \rho_1 = -2.86$$
$$\left.\begin{array}{l}\rho_2 = -0.35 \\ \rho_3 = -4.01\end{array}\right\} = \rho_2 - \rho_3 = +3.66$$
$$\Delta = +0.8$$

The fact that the value $\Delta$ is in my system nearly equal to zero (=0.8) forms the important feature of my invention, as by this fact the anastigmatic planing of the field is obtained. In all objectives hitherto constructed the value $\Delta$ will be three or four times greater, which is the reason for the astigmatic faults of these systems.

Two systems constructed as described above can advantageously be used for constructing holo and hemi symmetrical double objectives as shown in Fig. 2, in which case small differences between the two sets may be very advantageous for correcting small faults of the whole system. By means of the double objectives so constructed a density of light up to about F 3.9 can be attained.

Having thus fully described the nature of my said invention, what I desire to secure by Letters Patent of the United States is—

1. A photographic objective, consisting of a negative meniscus of higher refraction and a positive lens of lower refraction, which are arranged so as to leave a space between them which has the form of a negative lens, the sum of the differences in the curve of both lenses being about equal to zero, substantially as described and for the purpose set forth.

2. A photographic objective, consisting of two sets each consisting of a meniscus of higher refraction and a positive lens of lower refraction, which are arranged so as to leave a space between them, which has the form of a negative lens, the sum of the differences in the curve of both lenses being about equal to zero, substantially as described and for the purpose set forth.

In testimony whereof I have signed my name to this specification in the presence of two subscribing witnesses.

KARL MARTIN.

Witnesses:
   HENRY HASPER,
   WOLDEMAR HAUPT.